(No Model.)
M. H. OBERHOLSER.
LOCK FOR VEHICLE SEATS.
No. 575,038. Patented Jan. 12, 1897.
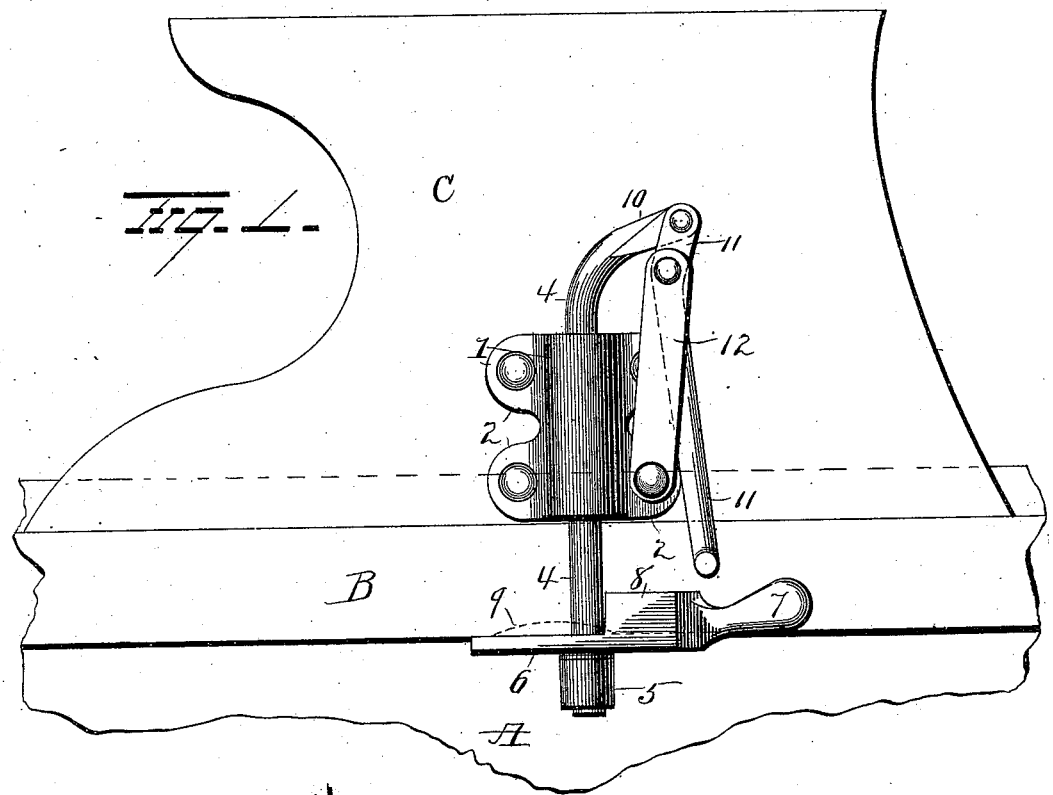
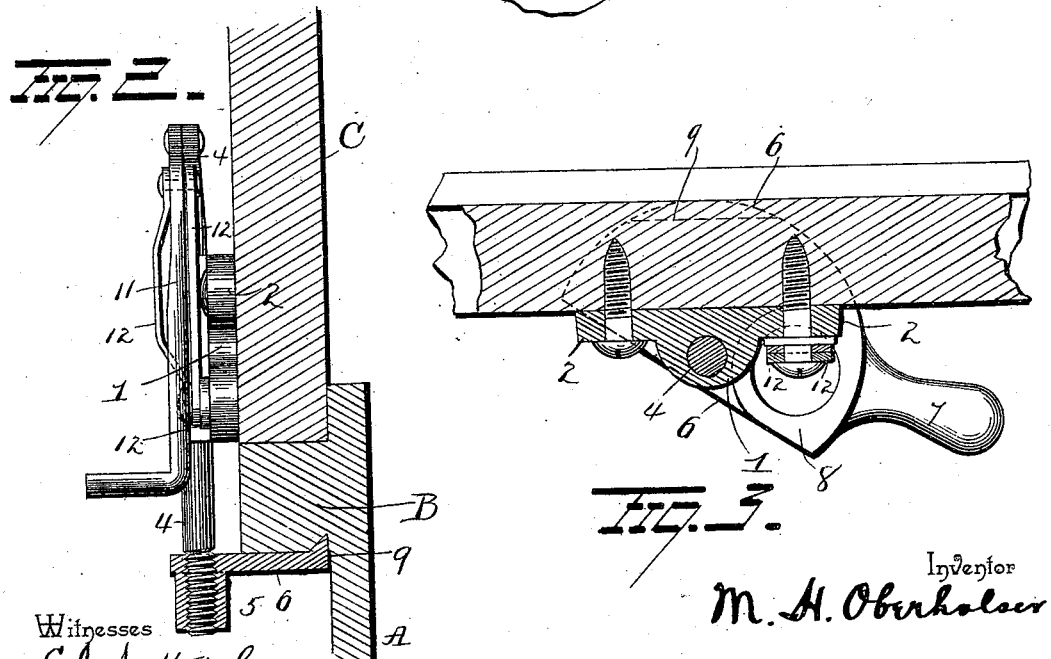
Witnesses
E. J. Nottingham
G. F. Downing
Inventor
M. H. Oberholser
By H. A. Seymour
Attorney ic.

UNITED STATES PATENT OFFICE.

MILTON HENRY OBERHOLSER, OF KINGSLEY, IOWA.

LOCK FOR VEHICLE-SEATS.

SPECIFICATION forming part of Letters Patent No. 575,038, dated January 12, 1897.

Application filed January 25, 1896. Serial No. 576,856. (No model.)

*To all whom it may concern:*

Be it known that I, MILTON HENRY OBERHOLSER, a resident of Kingsley, in the county of Plymouth and State of Iowa, have invented certain new and useful Improvements in Locks for Vehicle-Seats; and I do hereby declare the following to be a full, clear, and exact description of the invention, such as will enable others skilled in the art to which it appertains to make and use the same.

My invention relates to an improvement in locks for vehicle-seats, the object of the invention being to produce a seat-lock which shall be simple in construction, easy to operate, not liable to become accidentally unlocked, one which will not injure the seat-rail on the sides of the wagon or other vehicle-body, and to so construct a seat-lock that it shall be effectual in all respects in the performance of its functions.

With these objects in view the invention consists in certain novel features of construction and combinations and arrangements of parts, as hereinafter set forth, and pointed out in the claims.

In the accompanying drawings, Figure 1 is a view illustrating the application of my improvements. Figs. 2 and 3 are detail views.

A represents a portion of one side of a wagon-body, B the seat-rail secured thereto, and C one of the seat-standards.

To the inner face of the seat-standard C a bracket 1 is secured by means of screws or other fastening devices passing through lugs 2, projecting laterally from said bracket. The bracket 1 is made with a vertical hole for the accommodation of a rod or shaft 4, the lower end of which is screw-threaded for the reception of an internally-screw-threaded boss or enlargement 5 on a cam 6. The cam is provided with a knob or handle 7 whereby to turn it and cause it to project under the rail or riser B on the vehicle-body. The cam is also made with a stop 8, adapted to engage the rail B and limit the movement of the cam when turned in one direction or the other to cause said cam to engage the rail or release it therefrom. The cam is also provided with a tooth 9, adapted, when the cam is turned, to project under the rail to engage said rail, and when the cam is raised, as presently explained, to become embedded in the rail and prevent any accidental turning of the cam.

The upper end of the rod or shaft 4 is bent laterally, as at 10, and to the end of said curved portion of the shaft one end of a lever 11 is pivoted. Two links 12, preferably spaced apart between their ends, are pivoted at one end to the bracket 1 and at their other ends to the lever 11 at a point near the pivotal connection of said lever with the rod or shaft 4. It will be readily seen that by moving the free end of the lever 11 upwardly the rod or shaft 4 will be lowered. When the rod or shaft and the cam carried thereby shall have been thus lowered, the cam will be turned to the right, so as to project under the rail or riser B. When the cam shall have been turned until the stop thereon engages the rail, the tooth 9 will be in proper position to engage said rail. By now turning the lever toward the bracket 1 the rod or shaft 4 will be raised, the cam made to clamp the rail, and the tooth on the cam made to become embedded in said rail. The lever 11 is somewhat curved, so that it can be moved sufficiently far toward the bracket 1 to cause its pivotal connection with the links 12 to pass beyond alinement with the pivotal connection of the lever 11 with the rod 4 and the pivotal connection of the links 12 with the bracket 1. Thus it will be seen that when the lock is set there will be no liability of its becoming accidentally released. When it is desired to merely slide the seat along the rail, this may be accomplished by simply loosening the lock by means of the lever 11.

My improved lock can be readily adjusted to suit the rail by turning the cam or clamp 6 more or less on the rod or shaft 4, said cam or clamp being screwed on said rod or shaft, as above explained.

My improvements are simple in construction, cheap to manufacture, and effectual in all respects in the performance of their functions.

Slight changes might be made in the details of construction of my invention without departing from the spirit thereof or limiting its scope, and hence I do not wish to limit myself to the precise details herein set forth; but, Having fully described my invention, what I claim as new, and desire to secure by Letters Patent, is—

1. The combination with a bracket adapted to be secured to a seat-standard, a vertically-movable rod supported in said bracket, and a pivoted lever for raising and lowering the rod, of a rotary clamping-plate secured to the lower end of said rod, said plate being provided with a tooth and with a stop, substantially as set forth.

2. The combination with a bracket adapted to be secured to a seat-standard, a vertically-movable rod supported in said bracket, and a rotary clamping-plate secured to the lower end of said rod, of an operating-lever pivoted to the rod, and a link pivoted at one end to the bracket and at its other end to the lever, substantially as set forth.

3. The combination with a bracket adapted to be secured to a seat-standard, a vertically-movable rod supported in said bracket, and a clamping-plate secured to the lower end of said rod, of a lever pivoted to the rod, a link pivoted at one end to the lever and at its opposite end to the bracket, the construction of parts being substantially as described whereby the lever is automatically locked by the link, substantially as set forth.

4. The combination with a bracket adapted to be secured to a seat-standard, a shaft adapted to have a longitudinal movement in said bracket and a cam secured to said shaft and adapted to engage the seat-rail, of a lever pivoted to said shaft, and links pivoted at one end to said lever between the ends of the latter and at their other ends to said bracket, whereby when said lever is moved in one direction, the cam will be released from the seat-rail and when moved in the other direction said cam will be caused to clamp the rail, the pivotal connections of the lever and the links being such that the pivotal connection of the links with the lever will move out of alinement with the pivotal connection of the lever with the shaft and the links with the bracket, substantially as and for the purpose set forth.

In testimony whereof I have signed this specification in the presence of two subscribing witnesses.

MILTON HENRY OBERHOLSER.

Witnesses:
T. M. NAVIN,
J. S. ELLIS.